United States Patent
Yu

(10) Patent No.: US 9,626,205 B2
(45) Date of Patent: Apr. 18, 2017

(54) HYPERVISOR DRIVEN EMBEDDED ENDPOINT SECURITY MONITORING

(71) Applicant: Bank of America Corporation, Charlotte, NC (US)

(72) Inventor: Sounil Yu, Reston, VA (US)

(73) Assignee: Bank of America Corporation, Charlotte, NC (US)

( * ) Notice: Subject to any disclaimer, the term of this patent is extended or adjusted under 35 U.S.C. 154(b) by 709 days.

(21) Appl. No.: 13/966,729

(22) Filed: Aug. 14, 2013

(65) Prior Publication Data

US 2015/0052519 A1    Feb. 19, 2015

(51) Int. Cl.

| G06F 9/455 | (2006.01) |
|---|---|
| G06F 21/53 | (2013.01) |
| G06F 21/56 | (2013.01) |
| H04L 29/06 | (2006.01) |
| G06F 21/57 | (2013.01) |

(52) U.S. Cl.
CPC .......... *G06F 9/45541* (2013.01); *G06F 21/53* (2013.01); *G06F 21/566* (2013.01); *G06F 9/45558* (2013.01); *G06F 21/577* (2013.01); *G06F 2009/45587* (2013.01); *G06F 2009/45595* (2013.01); *H04L 63/1416* (2013.01)

(58) Field of Classification Search
CPC ... H04L 63/0227; G06F 8/65; G06F 9/45558; G06F 9/45533
See application file for complete search history.

(56) References Cited

U.S. PATENT DOCUMENTS

| 8,225,317 B1 * | 7/2012 | Chiueh et al. .......... G06F 9/455 713/164 |
| 8,484,640 B1 * | 7/2013 | Dobrovolskiy ..... G06F 9/45541 718/1 |
| 8,977,842 B1 * | 3/2015 | McCorkendale ....... G06F 21/53 380/285 |

(Continued)

OTHER PUBLICATIONS

Ibrahim, Amani S., et al. "CloudSec: a security monitoring appliance for Virtual Machines in the IaaS cloud model." 2011. Network and System Security (NSS), 2011 5th International Conference on. IEEE.*

*Primary Examiner* — Lewis A Bullock, Jr.
*Assistant Examiner* — Gilles Kepnang
(74) *Attorney, Agent, or Firm* — Banner & Witcoff, Ltd.; Michael A. Springs

(57) ABSTRACT

Aspects of the present disclosure are directed to methods and systems of hypervisor driven embedded endpoint security monitoring. A computer implemented method may include providing one or more computer processors configured to operate a bare-metal hypervisor; launching a user OS virtual machine operatively connected to the hypervisor; launching a security virtual machine operatively connected to the hypervisor and receiving data from the security virtual machine via the hypervisor; and receiving data representative of security information from the computer processor processed by the security virtual machine. The hypervisor may include using a virtual switch for providing communications between the user OS virtual machine and the security virtual machine. The method may include using the security virtual machine to monitor malware on the user OS virtual machine.

15 Claims, 3 Drawing Sheets

(56) References Cited

U.S. PATENT DOCUMENTS

| | | | |
|---|---|---|---|
| 2005/0204126 A1* | 9/2005 | Watson | G06F 21/10 713/150 |
| 2009/0249330 A1† | 10/2009 | Abercrombie | |
| 2009/0254990 A1* | 10/2009 | McGee | G06F 21/51 726/22 |
| 2010/0169948 A1* | 7/2010 | Budko | G06F 21/53 726/1 |
| 2011/0296408 A1* | 12/2011 | Lo | G06F 8/65 718/1 |
| 2012/0054744 A1* | 3/2012 | Singh | G06F 21/53 718/1 |
| 2012/0210318 A1* | 8/2012 | Sanghvi | G06F 9/45558 718/1 |
| 2012/0216273 A1* | 8/2012 | Rolette | G06F 21/577 726/13 |
| 2012/0240181 A1* | 9/2012 | McCorkendale | G06F 21/53 726/1 |
| 2012/0254993 A1* | 10/2012 | Sallam | G06F 21/53 726/22 |
| 2013/0036470 A1* | 2/2013 | Zhu | H04L 63/0227 726/23 |
| 2013/0247133 A1* | 9/2013 | Price | G06F 21/577 726/1 |
| 2014/0115578 A1* | 4/2014 | Cooper | G06F 21/606 718/1 |
| 2014/0137180 A1* | 5/2014 | Lukacs | G06F 21/53 726/1 |
| 2014/0373012 A1* | 12/2014 | Ylitalo | H04W 4/003 718/1 |

\* cited by examiner
† cited by third party

HYPERVISOR DRIVEN EMBEDDED ENDPOINT SECURITY MONITORING

BACKGROUND

Cloud computing is becoming increasingly popular. In cloud computing, a cloud may be an aggregation of resources provisioned on demand. Cloud computing may involve cloud resources performing computations instead of, or in addition to, a user's computer. Cloud computing has been compared to a utility, where computing is the service being provided. Numerous consumers use the Internet, among things to purchase products on-line, locate special events, read news stories, pay bills or perform on-line banking. Numerous business establishments are connected to the Internet to provide products and services to the consumer or perform business-to-business electronic commerce. E-commerce and Internet applications operate and transmit data over a world-wide interconnected communications network.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the present disclosure are directed to methods and systems hypervisor driven embedded endpoint security monitoring. In one aspect, a computer implemented method includes providing one or more computer processors configured to operate a bare-metal hypervisor; launching a user OS virtual machine operatively connected to the hypervisor; launching a security virtual machine operatively connected to the hypervisor and receiving data from the security virtual machine via the hypervisor; and receiving data representative of security information from the computer processor processed by the security virtual machine.

In one aspect, the hypervisor includes using a virtual switch for providing communications between the user OS virtual machine and the security virtual machine. In yet another aspect, the method may include using the security virtual machine to monitor hostile or intrusive software on the user OS virtual machine. In another aspect, the method may include receiving data representative of log activity associated with the one or more computer processors via the security virtual machine. In another aspect, the method may include receiving data representative of a computer readable memory associated with the one or more computer processors.

In another aspect, one or more non-transitory computer readable media storing computer executable instructions that, when executed by at least one processor, cause the at least one processor to launch a bare-metal hypervisor; launch a user OS virtual machine operatively connected to the hypervisor; launch a security virtual machine operatively connected to the hypervisor and receiving data from the security virtual machine via the hypervisor; and receive data representative of security information from the at least one processor processed by the security virtual machine.

In yet another aspect, a computer apparatus may include a user OS virtual machine; a security virtual machine; and a bare-metal hypervisor which mediates communication between the user OS virtual machine and the security virtual machine.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
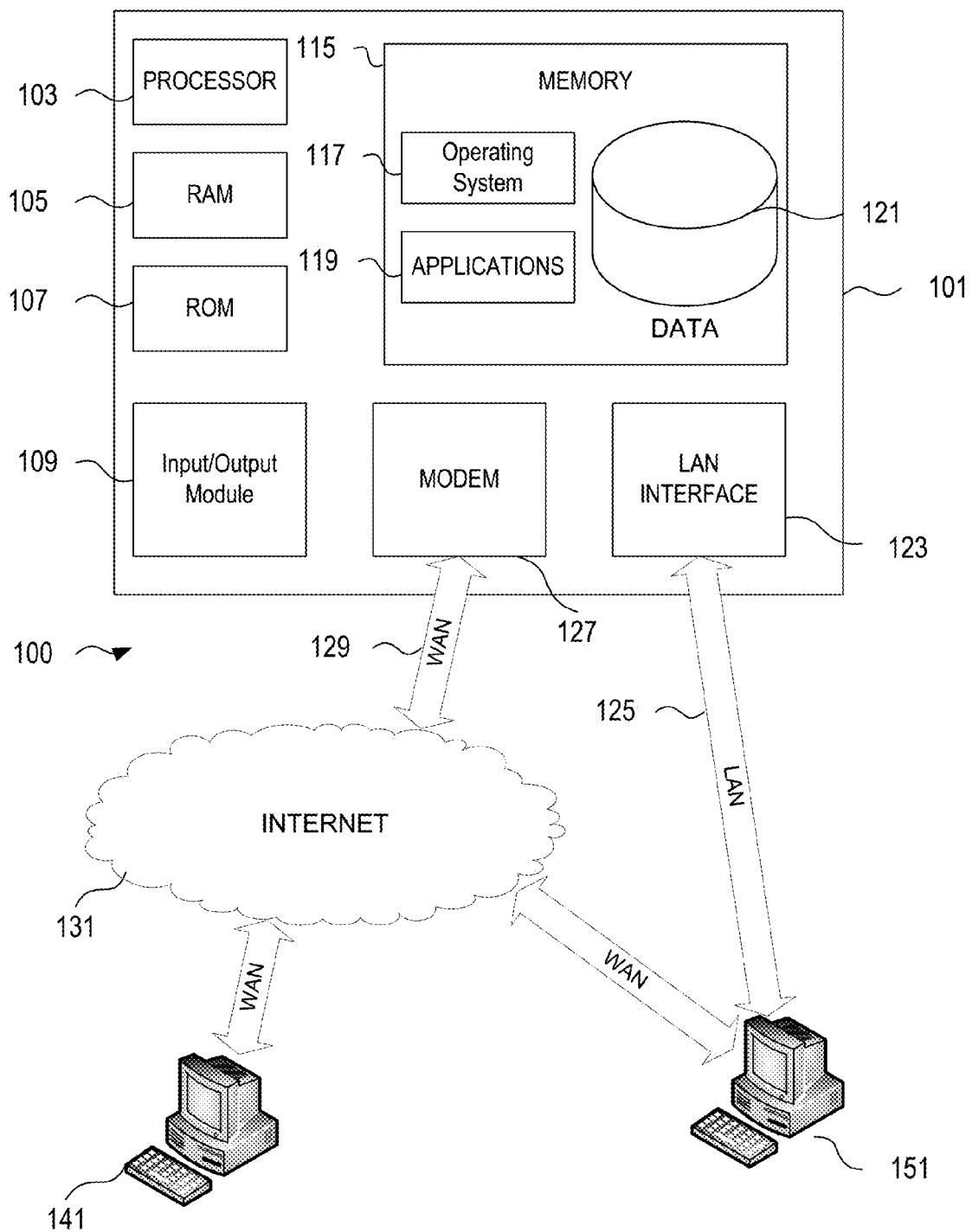
FIG. 1 depicts an illustrative operating environment in which various aspects of the present disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
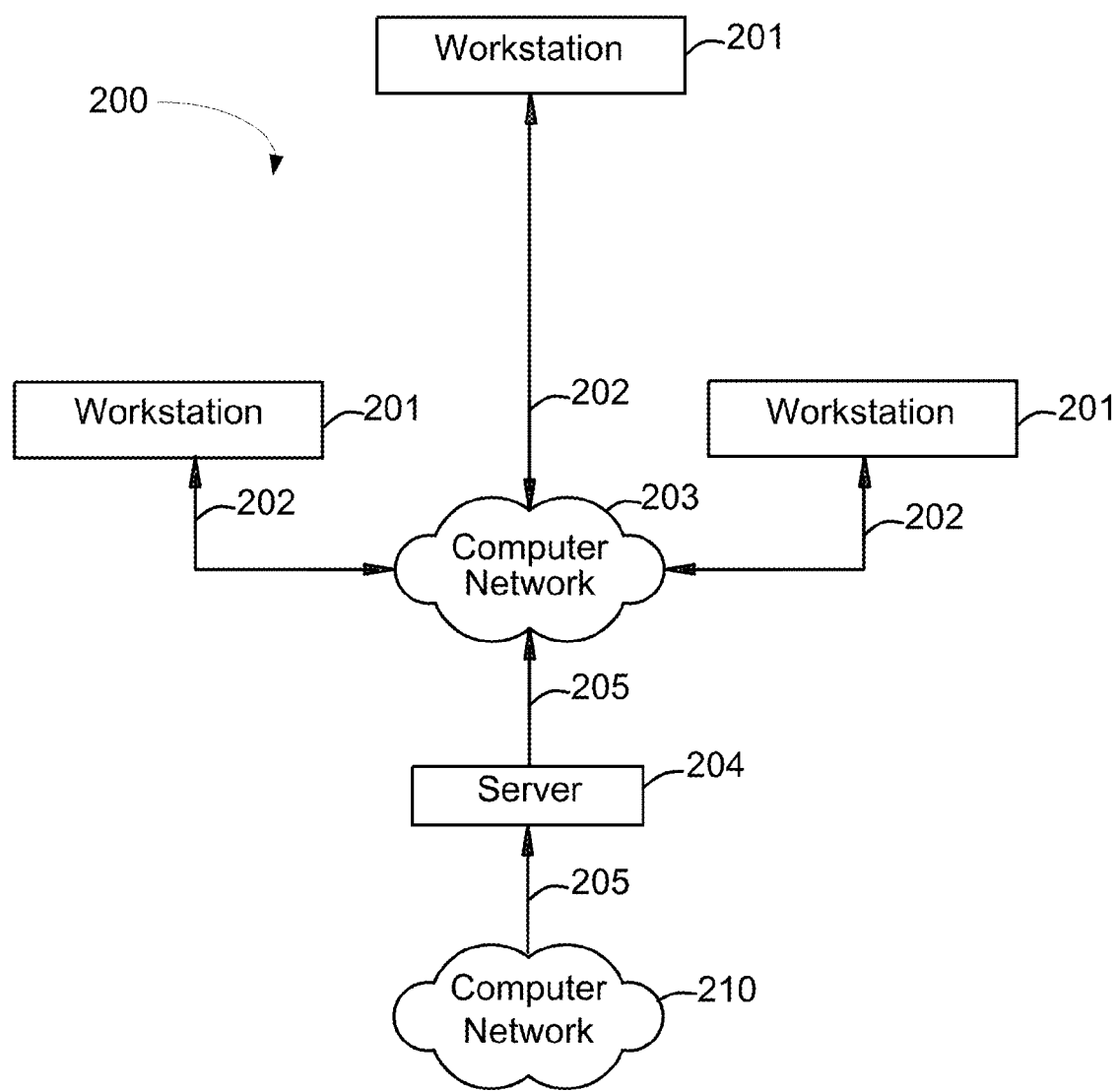
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204 (e.g. network control center), such as network links, dial-up links, wireless links, hard-wired links, as well as network types developed in the future, and the like. A virtual machine may be a software implementation of a computer that executes computer programs as if it were a standalone physical machine.

Figure 3:
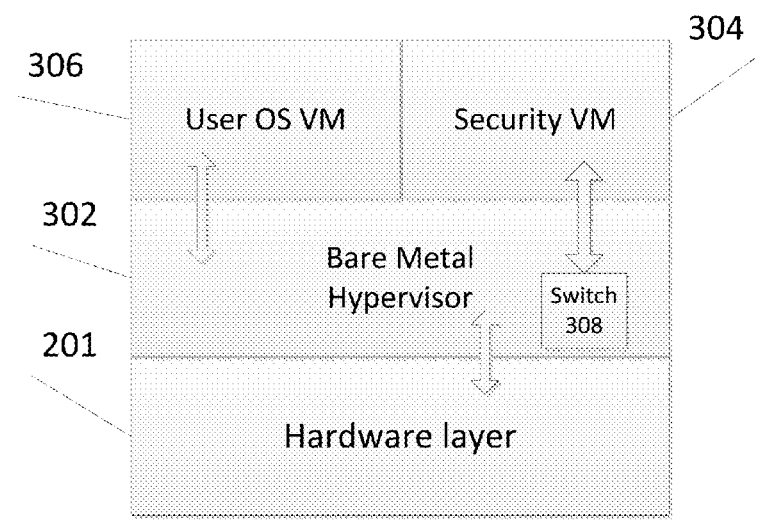
FIG. 3 depicts an illustrative operating environment in which various aspects of the present disclosure may be implemented in accordance with one or more example embodiments.

Referring to FIG. 3, in an example, a computing device 201 boots up into a bare metal hypervisor and transparently to the user, the hypervisor 302 may launch a virtual machine (VM) operating system. The bare-metal or Type-I hypervisor communicates directly with the computer hardware of computer device 201 acting as a physical hardware host. Concurrently, the hypervisor 302 also launches, transparently to the user, a security virtual machine 304 (e.g., security monitoring stack or security engine). In one example, the security VM 304 includes the network scrubbing or anti-virus tasks and other security functions to prevent hostile or intrusive software (e.g. malware code, scripts and other rogue software) infecting the computing device. In one construction, this security VM 304 may include dedicated communication, storage, and computer components used for checking integrity, authenticity, or security monitoring of the computer 201 as a node endpoint on the network cloud.

In some constructions, the security VM 304 can managed certain factors of data security and secure communications. For example, an IPSEC circuit is commonly to pertain to IP Security, a set of protocols to support secure exchange of packet at the IP layer in a TCP/IP network system. IPSEC systems have been deployed widely to implement Virtual Private Networks (VPNs). Under an IPSEC system, two encryption modes are supported: Transport and Tunnel. Transport mode encrypts only the payload portion of each packet, but leaves the header. The Tunnel mode encrypts both the header and the payload. On the receiving side, an IPSEC-compliant device decrypts each packet. The methods and features recited herein further may be implemented through any number of non-transitory computer readable media that are able to store computer readable instructions.

The security software functions are provided in a separate virtual machine 304 that intercepts the data traffic that comes in and out of the user OS VM 306 by the way of the hypervisor 302 and inspects the data traffic to make sure that the data integrity is maintained and protected without the running anti-virus applications locally on the computing device 201. In one implementation, the data traffic to the user VM 306 is mirrored to the security VM 304. Hence, when the computing device 201 boots up into hypervisor 302 and VM operating system environment 306, the security functions reside in the security VM 304. In this way, the security VM 304 isolates malicious software that could otherwise occur in the user OS VM 306 and the user experience is greatly improved as well reduce memory processing overhead. Correspondingly, the security VM enables introspection of the shared memory space and to analyze the shared memory space for hostile or intrusive code, for example.

The bare-metal hypervisor 302 mediates access to the computer 201 for the operating system VM 306 and the security VM 304. In one example, the hypervisor 302 includes an application programming interface (API) that can be abstracted as a virtual switch 308 at the hypervisor level such that the security VM 304 has full access to the virtual switch. In this manner, the security VM 304 runs itself when utilizing the virtual switch 308 and is inspecting the data to the computer abstracted as node endpoints on the network. This construction enables the traffic from the user operating system VM 306 to be directed the through the same hypervisor 302 that comprises the virtual switch to get to the network cloud. In this way, the security VM 304 would see data traffic in and out of the computer and going to the user operating system VM 306.

Referring to FIGS. 2-3, in the security monitoring context for a network control center (NCC), the security VM 304 is transparent to the user and can be centrally managed for that security monitoring through virtual machine introspection—from one machine discerning what is happening on another machine. In one example, the NCC with one or more server computers 204 can receive data representative of security information from a designated computing device (e.g. workstation 201). The computing device 201 may have at least a user OS virtual machine 206; a security virtual machine 304; and hypervisor 302 which provides communication between the user OS virtual machine and the security virtual machine.

The security VM 304 is enabled to provide data to store an electronic data log of activity in which the notions of what has occurred on the user OS VM 306 is recorded. The security VM 304 can be enabled to communicate securely on a LAN, WAN, or VPN to a security operating center (SOC) of the NCC via the bare-metal hypervisor virtual switch 308 or other software component(s). In such case, the security VMs 304 become network endpoint sensors that can be monitored for large scale data abstractions of the computers on the network 203. For example, the data log of the security VM 304 provides an indication of what happened on the particular computer. The security VM 304 would be set up so that it be can centrally accessed from anywhere connected to the LAN, WAN, or VPN and get details about what happened on that machine 201 as well as any other machine within the control of the NCC.

The NCC has a connection 202 to the hypervisor 304 and then subsequently access to the security VM 304. In this way, an ecosystem is created around a large data sensor-grid of nodes endpoints (e.g., a plurality of security VMs) that are listening in and reporting back data information to be collected for the centrally controlled operation at the NCC. The security VM 304 would not be subject to malware infection—the type of malicious attacks that the user OS VM 306 could experience. In the ecosystem, software components can be deployed in the network to the hypervisors or user operating system VMs in response to data analyzed in the sensor-grid. In other words, the NCC can consolidate the data received from the plurality of security VMs designated on the computers of the network via the hypervisors.

In one example from the NCC, the security VM 304 enables the separate stack to monitor the full security of the designated computer 201 through virtual machine introspection or via the traffic inspection. The system inspects data that comes in and out of designated machine 201 and processes the memory and the network traffic itself. In one example, shared memory 115 of the designated computer 201 can be inspected using the security VM 304 remotely at the NCC.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. An apparatus, comprising:
  a computing device having:
    at least one processor; and
    at least one memory storing computer executable instructions that, when executed, cause the apparatus at least to:
      booting up a bare-metal hypervisor on the computing device; in response to booting up the bare-metal hypervisor, concurrently launching a user OS virtual machine and a security virtual machine (security VM) transparent to a user on the computing device, the security VM isolating malicious software occurring in the user OS virtual machine;
      abstracting an application programming interface (API) of the computing device into a virtual switch, the security virtual machine having full access to the virtual switch; mirroring data traffic to and from the user OS virtual machine;
      directing data from the user OS virtual machine to a network cloud, the mirrored data traffic being directed through the virtual switch of the hypervisor;
      routing the mirrored data traffic to the security VM; and monitoring the data traffic by the security VM by: observing all data traffic to and from the user OS virtual machine via the virtual switch; and
      sending data representative of security information to a network control center (NCC) server; and
    the NCC server configured to:
      receive said data representative of security information;
      subsequently analyze the security information; and
      in response to analysis of the security information, deploy components to the bare-metal hypervisor.

2. The apparatus of claim 1, wherein the executable instructions, when executed, further cause the apparatus to use the security virtual machine to monitor intrusive executable instructions on the user OS virtual machine.

3. The apparatus of claim 1, wherein the executable instructions, when executed, further cause the apparatus to receive data representative of log activity associated with the computing device.

4. The apparatus of claim 1, wherein the executable instructions, when executed, further cause the apparatus to receive data representative of a shared memory associated with the computing device.

5. The apparatus of claim 1, wherein the executable instructions, when executed, further cause the apparatus to check authenticity of the computing device as a node endpoint by the security virtual machine.

6. A computer implemented method, comprising:
  providing one or more computer processors configured to boot up a bare-metal hypervisor;
  in response to booting up the bare-metal hypervisor, concurrently launching a user OS virtual machine and a security virtual machine (VM) transparent to a user, the security VM isolating malicious software occurring in the user OS virtual machine;
  abstracting an application programming interface (API) into a virtual switch, the security virtual machine having full access to the virtual switch; mirroring data traffic to and from the user OS virtual machine;
  directing data from the user OS virtual machine to a network cloud, the mirrored data traffic being directed through the virtual switch of the hypervisor;
  routing the mirrored data traffic to the security VM;
  monitoring the data traffic by the security VM by:
    observing all data traffic to and from the user OS virtual machine via the virtual switch; and
    sending security information to a network control center (NCC) server;
  receiving, by the NCC server, said data representative of the security information;
  subsequently analyzing the security information; and
  in response to analysis of the security information, deploying components to the bare-metal hypervisor.

7. The computer implemented method of claim 6, further comprising a step of using the security virtual machine to monitor intrusive executable instructions on the user OS virtual machine.

8. The computer implemented method of claim 6, further comprising a step of receiving data representative of log activity associated with the one or more computer processors via the security virtual machine.

9. The computer implemented method of claim 6, further comprising a step of receiving data representative of a shared memory associated with the one or more computer processors.

10. The computer implemented method of claim 6, further comprising a step of checking authenticity of the one or more computer processors as a node endpoint by the security virtual machine.

11. One or more non-transitory computer readable media storing computer executable instructions that, when executed by at least one processor, cause the at least one processor to perform a method comprising:
  booting up a bare-metal hypervisor;
  in response to booting up the bare-metal hypervisor, concurrently launching a user OS virtual machine and a security virtual machine (VM) transparent to a user, the security VM isolating malicious software occurring in the user OS virtual machine;

abstracting an application programming interface (API) into a virtual switch, the security virtual machine having full access to the virtual switch; mirroring data traffic to and from the user OS virtual machine;

directing data from the user OS virtual machine to a network cloud, the mirrored data traffic being directed through the virtual switch of the hypervisor;

routing the mirrored data traffic to the security VM;

monitoring the data traffic by the security VM by:
- observing all data traffic to and from the user OS virtual machine via the virtual switch; and
- sending security information to a network control center (NCC) server;

receiving, by the NCC server, said data representative of the security information;

subsequently analyzing the security information; and in response to the analysis of the security information, deploying components to the bare-metal hypervisor.

12. The one or more non-transitory computer readable media of claim 11, further comprising a step of using the security virtual machine to monitor intrusive executable instructions on the user OS virtual machine.

13. The one or more non-transitory computer readable media of claim 11, further comprising a step of receiving data representative of log activity associated with the one or more computer processors via the security virtual machine.

14. The one or more non-transitory computer readable media of claim 11, further comprising a step of receiving data representative of a shared memory associated with the least one processor.

15. The one or more non-transitory computer readable media of claim 11, further comprising a step of checking authenticity of the at least one processor as a node endpoint by the security virtual machine.

* * * * *